United States Patent
Bhandarkar et al.

(10) Patent No.: US 7,159,421 B2
(45) Date of Patent: Jan. 9, 2007

(54) MANUFACTURE OF PLANAR WAVEGUIDES USING SOL-GEL TECHNIQUES

(75) Inventors: Suhas Bhandarkar, Alfred, NY (US); Henry Du, Short Hills, NJ (US); David Wilfred Johnson, Bedminster, NJ (US); Deok-Yang Kim, New York, NY (US); Glen R. Kowach, Fanwood, NJ (US)

(73) Assignee: Agere Systems Inc., Allentown, PA (US)

( * ) Notice: Subject to any disclaimer, the term of this patent is extended or adjusted under 35 U.S.C. 154(b) by 604 days.

(21) Appl. No.: 10/196,678

(22) Filed: Jul. 16, 2002

(65) Prior Publication Data

US 2004/0221619 A1    Nov. 11, 2004

(51) Int. Cl.
C03B 8/02    (2006.01)
(52) U.S. Cl. .................. 65/386; 65/17.2; 65/395; 65/398; 65/440
(58) Field of Classification Search ............ 65/386, 65/395, 398, 440, 17.5, 17.6, 17.2
See application file for complete search history.

(56) References Cited

U.S. PATENT DOCUMENTS 3,920,578 A * 11/1975 Yates .................... 516/79
6,343,490 B1 * 2/2002 Alonzo et al. ............ 65/395
6,391,515 B1 * 5/2002 Su et al. .................. 430/198

FOREIGN PATENT DOCUMENTS

EP    1167308 A1 *  1/2002

OTHER PUBLICATIONS

Orignac et al., "Silica-based sol-gel optical waveguides on silicon," IEE Proc.-Optoelectron., vol. 143, No. 5, Oct. 1996, p. 287-292.*
Ballato et al., "Patterning for planar waveguides," Electronic Letters, vol. 33, No. 1, Jan. 2, 1997, p. 83-84.*
Jones et al., Silicon-Containing Polymers—The Science and Technology of Their Synthesis and Applications, Copyright 2000, p. 224.*
Forastiere et al., "Strip-Loaded Sol-Gel Waveguides: Design and Fabrication," Fiber and Integrated Optics, 20:29-43, Copyright 2001, p. 29-43.*
Syms et al., "Low loss achieved in sol-gel based silica-on-silicon integrated optics using borophosphosilicate glass," Electronic Letters, vol. 31, No. 21, Oct. 12, 1995, p. 1833-1834.*

* cited by examiner

Primary Examiner—Sean Vincent (57) ABSTRACT

Silica sol techniques are described for making thick silica or silica based films useful for planar optical waveguides. The process involves coating of a colloidal silica sol onto a substrate, drying the sol, and consolidating the dried sol to form the planar waveguide. Coating is performed in a simple operation, either by dipping, or preferably by spin coating. In a preferred embodiment the substrate is coated with a wetting agent prior to spin coating. It is found that the wetting agent substantially improves the thickness uniformity of the layer.

Thick waveguide layers may be produced by repeating the coating process one or more times to produce a layer with the desired thickness. Buried waveguides are produced by forming a doped core layer, patterning the doped core layer and using the coating technique of the invention to form the cladding material.

17 Claims, 6 Drawing Sheets

MANUFACTURE OF PLANAR WAVEGUIDES USING SOL-GEL TECHNIQUES

FIELD OF THE INVENTION

This invention relates to the manufacture of thick films using sol gel processing. It is especially applicable to techniques for making planar waveguides for optical integrated circuits (OICs).

BACKGROUND OF THE INVENTION

With the dramatic growth of fiber optic communications systems, devices for processing optical signals have become increasingly important. Planar devices comprising optical waveguides fabricated on planar substrates offer a promising environment for receiving and processing signals from optical fibers. These waveguides are used in OIC devices for optical signal processing. A variety of methods have been suggested for the manufacture of high-silica content glass articles, such as the single and double dispersion processes described by D. W. Johnson, et al. in Fabrication Of Sintered High-Silica Glasses, U.S. Pat. No. 4,419,115, and the process described by D. W. Johnson, et al in Sintered High-Silica Glass And Articles Comprising Same, U.S. Pat. No. 4,605,428. Sol gel techniques for making optical quality glass bodies are described by Chandross et al. in U.S. Pat. No. 5,240,488. That patent provides the basic sol gel process for these applications and is incorporated herein in its entirety for providing that process information.

A variety of approaches may be considered for making planar waveguide structures. For example, chemical vapor deposition (CVD) is widely used in silicon technology for producing thin films of $SiO_2$. However, CVD $SiO_2$ grows only fractions of a micrometer per hour. Thin silica films on silicon wafers may also be produced by growing oxide directly on a silicon wafer by standard high pressure oxidation. This approach is attractive since the processing and patterning of $SiO_2$ layers on silicon is well developed. However, again, this growth is slow and the practical film thickness is limited to about 15 micrometers and can be used only as an undercladding for waveguiding devices.

Other glasses, such as sodium-boro-silicate glass, can be formed in thin films, but it is difficult to make such films that are suitable for optical waveguide applications.

A simple, rapid, and economical technique for making optical quality glass planar waveguide structures would constitute an important contribution to the technology.

SUMMARY OF THE INVENTION

We have developed a sol-gel process for making relatively thick silica or silica based films useful for planar waveguides. The process involves coating a colloidal silica sol onto a substrate, drying the sol, and consolidating the dried sol to form the planar waveguide. Coating is performed in a simple operation, either by dipping, or preferably by spin coating. In a preferred embodiment the substrate is coated with a wetting agent prior to coating. It is found that the wetting agent substantially improves the thickness uniformity of the layer.

Thick waveguide layers may be produced by repeating the coating process one or more times to produce a layer with the desired thickness. A wetting agent is advantageously used prior to each coating step.

Doped layers are produced according to the invention by incorporating one or more dopants in the sol solution. Buried waveguides may be produced by forming an undercladding, forming a doped core layer, patterning the doped core layer and using the coating technique of the invention to form the remaining cladding material. In other embodiments, the doped core layer may be produced by a conventional technique, and the process of the invention used to produce just the cladding material. The coating approach of the invention results in a conformal coating around the preformed core of the waveguide.

In another embodiment, the doped core of the waveguide is selectively formed on a substrate using an additive process. This may be achieved by forming a negative pattern on the substrate of a hydrophobic material that prevents wetting by the colloidal sol. The sol deposits selectively on the regions of the substrate that are not coated with the hydrophobic material.

In the method of the invention, in contrast with conventional sol-gel methods, a mold for the sol-gel body is not needed. This simplifies the process and avoids the mold release step, and problems with defective molds.

DETAILED DESCRIPTION

As indicated above, the invention is directed to forming layers of high silica glass by coating substrates with high silica sols, then drying and consolidating the sol. The sol may be applied to the substrate by simply dipping the substrate into the sol solution. The preferred coating method uses spin-coating. With it understood that the invention is not limited to spin-coating as the application method, the following description is directed to the preferred coating approach.

Figure 1:
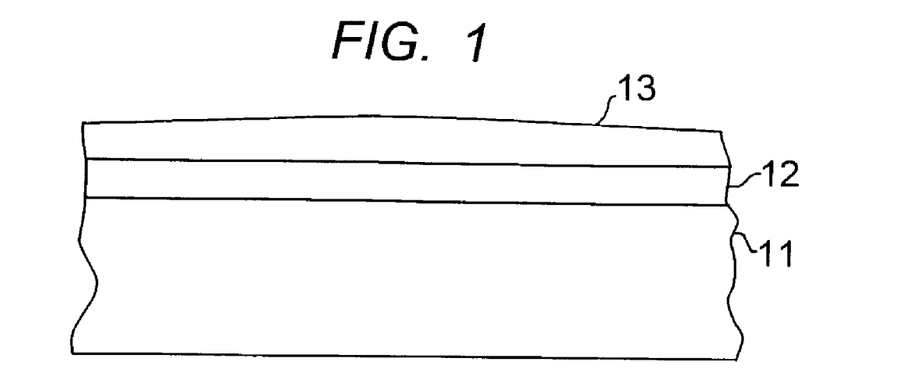
FIG. 1 is a schematic illustration of a spin-coated substrate showing sol gel thickness non-uniformity.

With reference to FIG. 1, a substrate 11 is shown with a surface layer 12. A preferred substrate is a silicon wafer, with an $SiO_2$ layer 12 grown on the surface of the silicon wafer. Methods for producing this starting structure are well known. The thickness of the $SiO_2$ layer is not critical but should be sufficient to guide the light in the subsequent core structure. A suitable range is 10–15 microns. $SiO_2$ is preferred for light guiding (cladding) properties in the context of the overall structures to be described below. Other substrates, with surface cladding layers or without, may be used, such as borosilicate or other glass, sapphire, lithium niobate, gallium arsenide. Silicon substrates may also be used.

The sol used in the process of the invention is a colloidal dispersion of silica particles and is obtained by mixing silica particles and water. The mixture typically contains about 30 to 75 wt. % silica, advantageously about 40 to 65 wt. % silica, with the size of the silica powder characterized by surface area generally ranging from 5 to 100 $m^2/g$. The dispersion has a pH initially of about 4. The dispersion is then stabilized by conventional methods, typically at a pH of about 10 to 13. In this pH regime, silica particles take on a negative surface charge as a result of the ionization of silanol groups on the surface. The repulsive force between silica particles prevents coagulation, aggregation or flocculation of silica particles in the sol. Stabilization of the sol is usually provided by adding tetramethylammonium hydroxide (TMAH), although other organic bases, including other tetraalkylammonium hydroxides or amines, are also suitable.

The two main variables in sol formation using the colloidal method are 1) sol loading of the silica powder, and 2) viscosity of the sol. These two factors impact the thickness of the coatings in both dip coating and spin coating. There is a weak correlation between higher solid loading and increased viscosity. However, sol viscosity is mostly dependent on processing conditions (e.g. dispersion conditions). Relatively large silica particles, i.e. particles with a diameter of 40 ±30 nm were found suitable for the sol mixture. Using these particles, a 55 wt % (37 vol %) colloidal silica sol was prepared with a viscosity of 15 cP. Low viscosity, i.e. 5–20 cP, allows a large window for the spin coating parameters. However, viscosities in the range of 1–1000 cP are useful.

It will be recognized by those skilled in the art that this sol method is the colloidal method in contrast with the other prominent silica sol method, the alkoxide method. The alkoxide method is fundamentally different. It does not start with particles in the sol, but produces a sol by hydrolysis of silicon alkoxide. The sol is a mixture of silicon alkoxide, water, alcohol and a catalyst such as hydrochloric acid or ammonia. No particulates are used in the starting mixture. We have found that this sol-forming technique, when applied to the coating method described here, is not suitable for preparing thick sol-gel films. The sol solution, represented by layer 13 in FIG. 1, is spin-coated on the surface 12 by known spin-coating methods. (For additional details on sol preparation see U.S. Pat. No. 5,240,488, referenced above.) Spin-coating is one of the simplest and most common technique of applying thin films onto wafers. The process involves simple fluid flow and evaporation behaviors that generally give uniform coatings. However, complexities arise with complex coating solutions that often conspire to prevent flat, high-quality, coatings. One of these is illustrated in FIG. 1, where a significant radial variation in layer thickness is observed. This is typical of the spin-coating behavior of high silica sols because of the requirement for high silica loading in the sol. Colloidal silica sols show a shear thinning behavior, which deviates from a Newtonian fluid where the viscosity of a liquid is independent of shear rate. This shear-thinning behavior causes the film to be thicker near the center of the spin-coated layer.

The viscosity range and the fluid dynamics of the sol are relatively fixed due to the nature of the high silica sol process. Therefore, the problem illustrated in FIG. 1 cannot, in general, be approached by simply tailoring the fluid dynamics of the sol. It will be recognized by those skilled in the art that there is no convenient way of planarizing the layer in FIG. 1 once the non-uniformities inherent in the spin-coating process occur.

A solution to the thickness non-uniformity problem, according to one aspect of the invention is to form a bonding layer on the surface on which the spin-coating material is introduced. The bonding layer improves the wetting of the sol to the substrate surface. For the purpose of defining the invention, the bonding layer is a layer that reduces the entropy of the surface. This effect is well known, and materials useful for this may be referred as surfactants or wetting agents. The wetting agent is introduced to improve the coverage of the film on the substrate. Without the bonding layer formed by the wetting agent, the film is much more prone to pinholes. Film uniformity is difficult to achieve due to the inherent characteristics of colloidal solution, e.g. shear thinning. Adding the wetting layer between dried films during multi-coating improves the thickness uniformity, and reduces the tendency of the gel to crack. Among those recommended for use with this invention are alkylammonium silicates, e.g., tetramethylammonium silicate (TMAS), polydimethylsulfone (PDMS), alkali alkyl sulfates, e.g. sodium dodecyl sulfate (SDS), and alkali fluoroalkyl carboxylates, e.g. 3M Flouorad FC-129.

Figure 2:
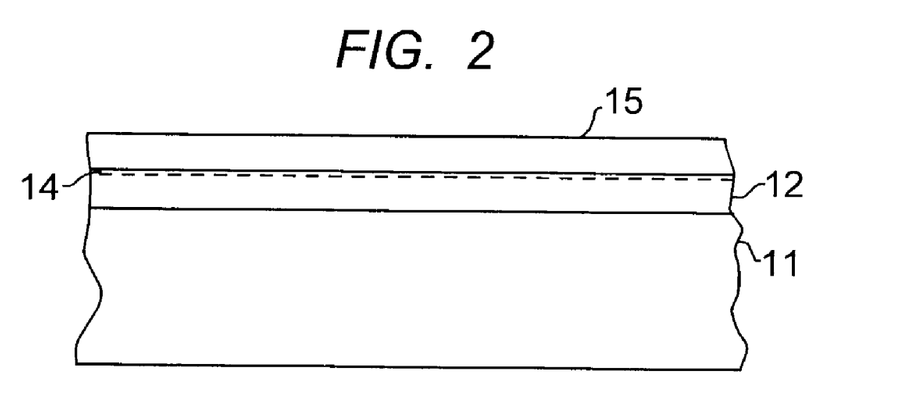
FIG. 2 is a schematic representation similar to that of FIG. 1 showing the effect of a wetting layer on sol gel thickness uniformity.

With reference to FIG. 2. the bonding layer is represented by dashed line 14. The effect of the application of the bonding layer is to smooth layer 15 and produce a uniform thickness.

The thickness of layer 15 will is influenced by several variables but typically will be 10 microns or less, more typically 5 microns or less. This initial thickness will produce a final layer of less than 5 microns after shrinkage.

After spin-coating the substrate with the silica sol, the sol is allowed to dry. Heating to a temperature of 200° C. or above, with 300–400° C. recommended, for at least 5 minutes is effective to dry and stabilize the sol.

Figure 3:
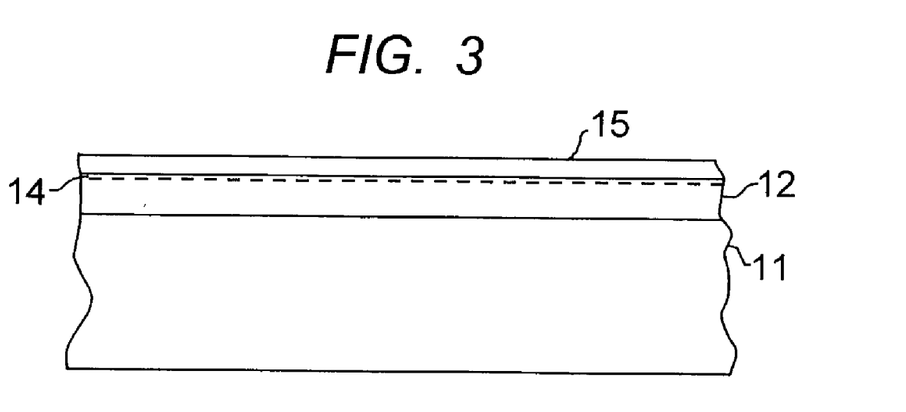
FIG. 3 represents the structure shown in FIG. 2 after consolidation.

The dried sol on the spin-coated substrate may then be consolidated by first burning off the organics (TMAH) by heating to a temperature of 500° C. or above in oxygen or air, then densified by heating for two hours in nitrogen at 1300° C. to produce transparent glass waveguide layer. The waveguide layer is then etched (see below) to produce the optical waveguide. Consolidation typically produces shrinkage of the dried sol layer. FIG. 3 shows the deposited and dried layer 15 after consolidation. Comparing layer 15 in FIG. 2 with layer 15 in FIG. 3 illustrates the shrinkage, which may be as much as 50%.

Figure 4:
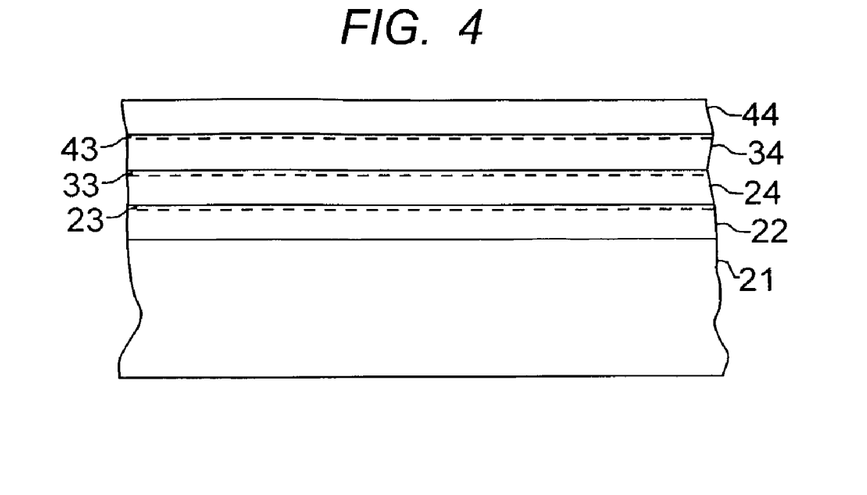
FIG. 4 is a schematic representation showing multiple coatings of sol gel.
Figure 5:
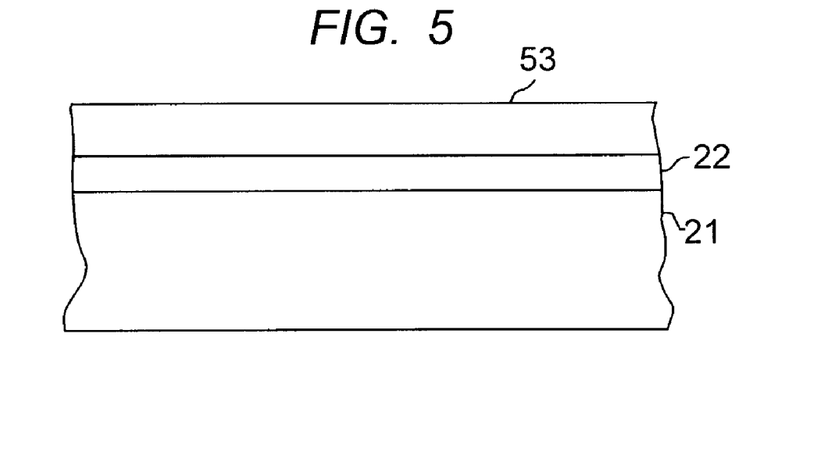
FIGS. 5, 6, 7 and 8 show steps in performing the multiple layer sol gel waveguide process.

In a preferred embodiment of the invention, the waveguide is formed by a multiple layer approach. Several options are available for producing multiple silica layers. For example, the steps just described may be repeated as many times as desired. Thus, if the steps described produce a 3 micron layer, a 12 micron thick waveguide may be produced by repeating the process four times. A more efficient method is to perform the steps described up to and including the drying step, all of which can be performed rapidly. This method is illustrated in FIG. 4, where substrate 21 and substrate layer 22 are coated with sequential steps of applying bonding layer 23, spin-coating sol layer 24 on bonding layer 23, drying layer 24, applying bonding layer 33, spin-coating sol layer 34 on bonding layer 33, drying sol layer 34, applying bonding layer 43, spin-coating sol layer 44 on bonding layer 43, and drying sol layer 44. After this predeposit of three dried sol layers, all of the sol layers may be consolidated in a single step. The resulting thick consolidated layer is represented by layer 53 in FIG. 5. (In FIG. 5, and subsequent figures, bonding layers are omitted for simplicity.)

Figure 6:
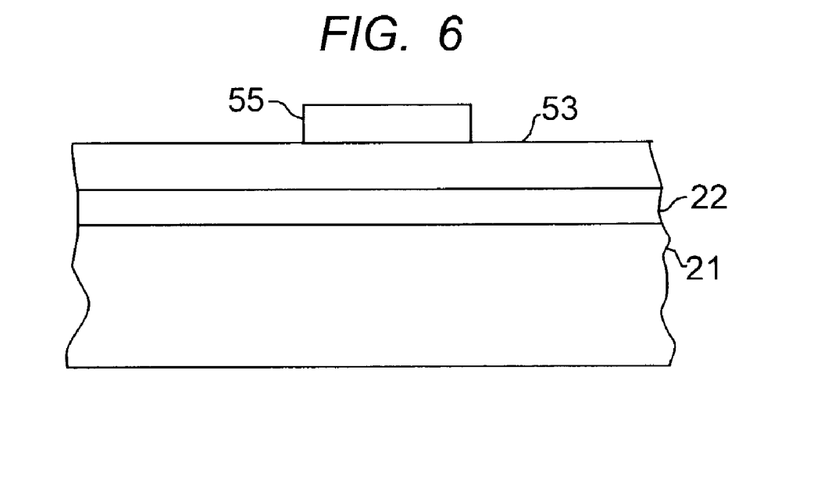
Figure 7:
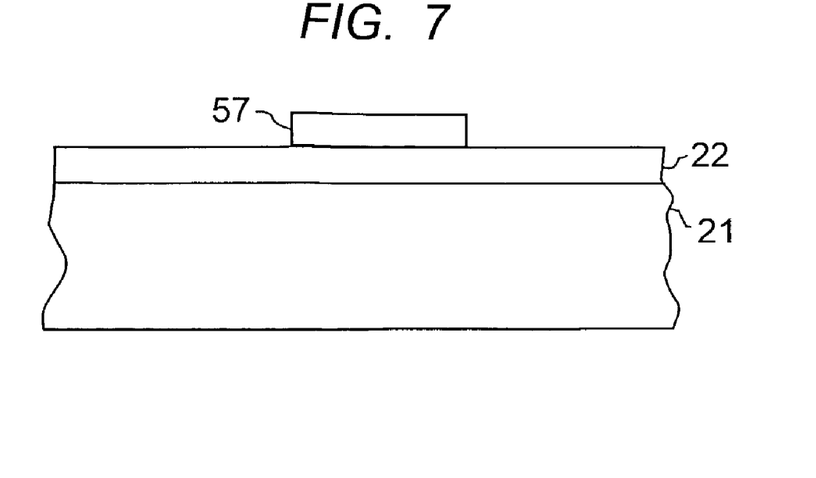

The waveguide layer 53 may be patterned to form the optical waveguide using standard patterning techniques. As shown in FIG. 6, a mask 55 is defined over the waveguide layer 53. The mask may be produced by photolithography or other suitable method. The exposed areas are etched away using a conventional wet etchant such as HF. Alternatively, plasma etching methods may be used for patterning the waveguide layer. The resulting structure is shown in FIG. 7 with the waveguide at 57.

In the embodiments described above, the waveguide layer is consolidated before patterning. A useful alternative is to pattern the waveguide layer prior to consolidation. For example, at the stage of the process represented by FIG. 2, after sol deposition and drying, the layer 15 may be masked and the waveguide defined by etching as described above. Likewise the multi-layer structure shown in FIG. 4 may be patterned at that stage of the process.

The waveguide structures represented by FIGS. 1–7 are shown as unclad waveguides. A preferred waveguide structure has a solid cladding to minimize power losses. In the most desirable case the waveguide is buried in a planar waveguide configuration. The following embodiments describe the use of the invention for making buried waveguide structures.

Figure 8:
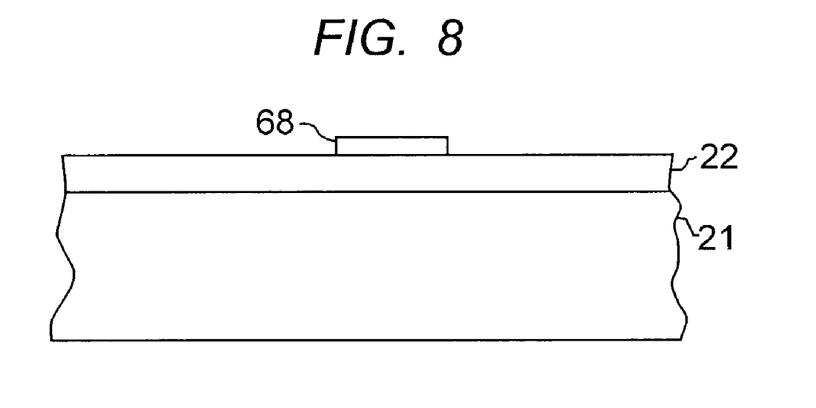

FIG. 8 shows a substrate 21 with surface layer 22 which may be the same or similar to those elements described earlier. The waveguide element 68 in this case is a doped core.

Doping of colloidal silica sol may been done by adding tetramethylammonium (TMA) salts of dopants, such as Ge. The solubility of most oxides in water is negligible. Therefore, salts containing the dopant atoms are used. In the case of Ge doping, the hexagonal phase of $GeO_2$ may be dissolved in a 25 wt % TMA basic solution to make a TMA salt of germanate ($TMAH \cdot GeO_2$). In the same manner, boron doping may be achieved using boric acid ($H_3BO_3$) to form a TMA salt of borate. For phosphorus doping, phosphoric acid ($H_3PO_4$) may be titrated with TMAH to yield a TMA salt of phosphate.

The solubility limit of these dopants depends on the molar ratio of the dopant to TMAH (approximately 1.5–2.0). The pH of these salts is basic due to TMAH. Each salt can be easily added to the colloidal silica sol and mixed without disrupting the stability of the colloidal sol. The amount of dopant that can be incorporated into the sol is limited by the amount of TMAH the sol will tolerate before it is destabilized (typically 8 wt %). Fluorine doping of the silica sol, for down-doping of the index, may be achieved by addition of fluorine containing liquids of gas phase treatment of the dried gel with gasses such as $F_2$, $SiF_4$, or tetramethylammonium fluoride (TMAF) prior to or during consolidation.

Other additives to the sol, classified here as dopants, include rare earths, e.g. Er, for optical fiber amplifiers, and Al, for increasing the solubility of rare earth additives. These additives also may be used as simple salts, such as nitrates, or may be salts complexed with TMA prior to addition to the sol.

The effect of dopant additions to silica in terms of changes in refractive index are, in general, known. However, the changes may vary depending on the particular synthesis technique used. The following table lists some examples obtained using the methods of the invention.

TABLE 1

| dopant | concentration range | refractive index (at 632.8 nm) |
|---|---|---|
| $GeO_2$ | 0~9 mol % | 1.458~1.472 |
| $B_2O_3$ | 0~10 mol % | 1.444~1.458 |
| $P_2O_5$ | 0~7 mol % | 1.458~1.465 |

Figure 14:
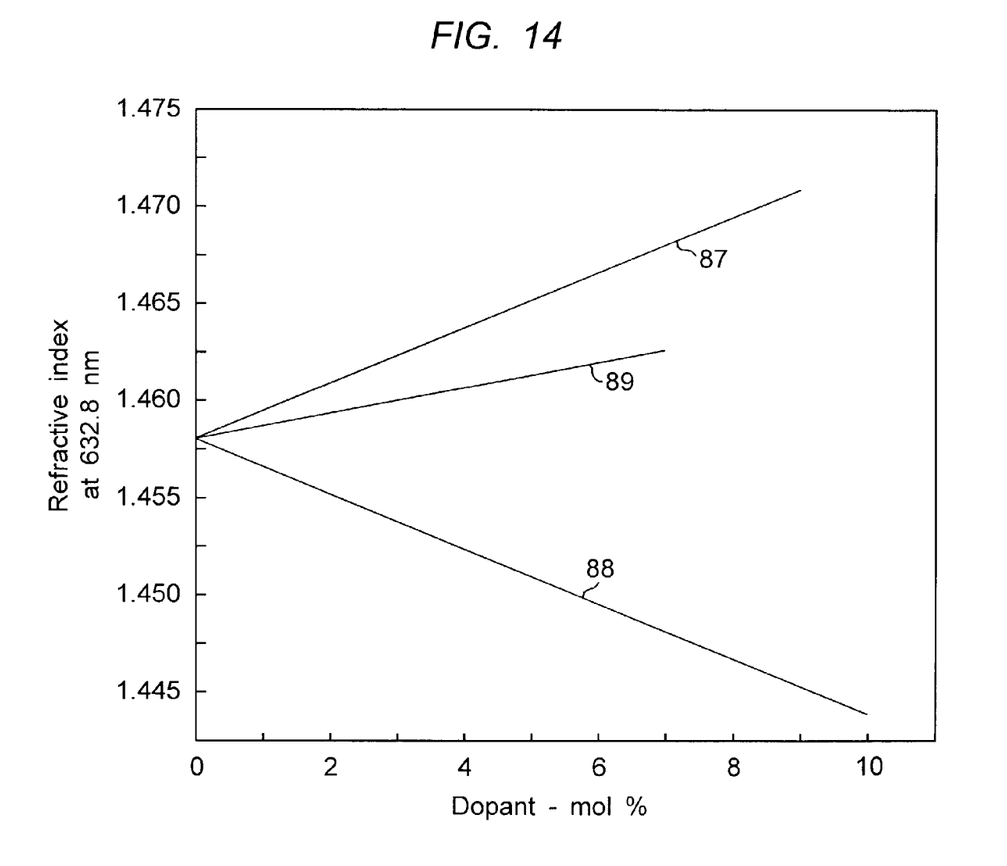
FIG. 14 is a plot of refractive index vs. dopant concentration showing results of the process for making doped silica waveguides.

These results are plotted in FIG. 14, with mol % as abscissa and refractive index as ordinate. The curves for the up-dopants, germanium and phosphorus are given at 87 and 89 respectively, while the curve for the down-dopant is shown at 88.

Figure 9:
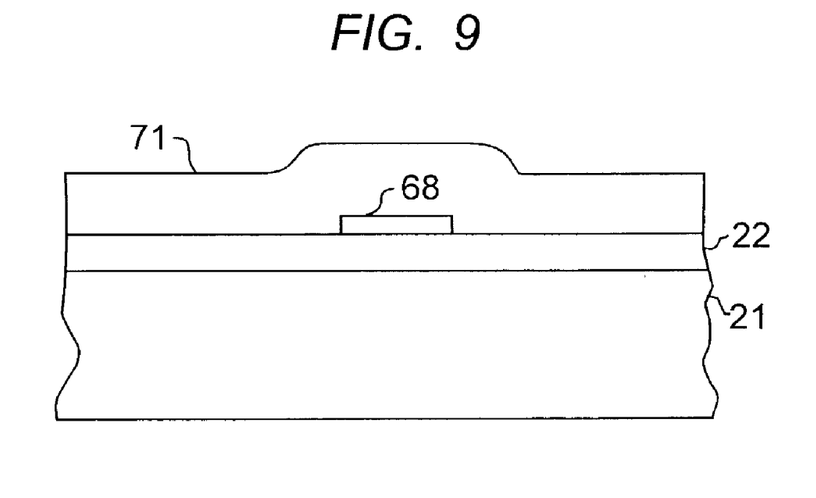
FIGS. 9 and 10 illustrate steps for forming a buried waveguide.
Figure 10:
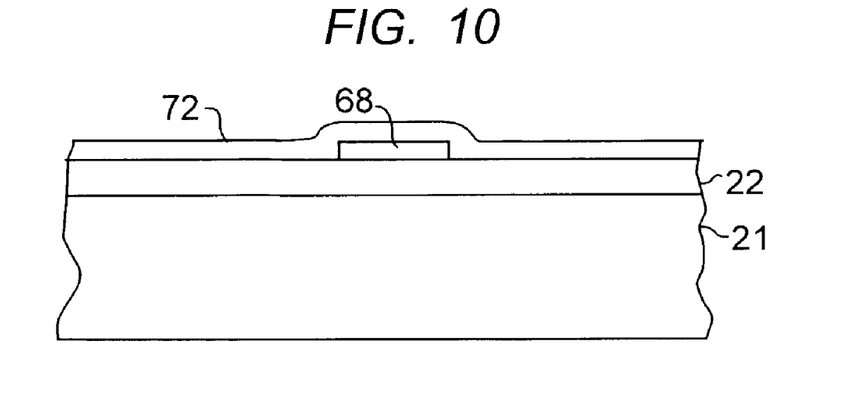

Using the multi-layer method described above, the layer sequence may vary depending on the structure desired. A buried waveguide will typically have a cladding layer underneath the waveguide. This cladding may be a substrate layer, for example, layer 22 in FIG. 8, or may be the first one or more layers of the multiplayer stack shown in FIG. 4. For example, one or more layers of pure silica, or boron doped silica, or combinations of phosphorus and boron, may be formed first to serve as the bottom cladding. The doped waveguide layer is next formed on the lower cladding layer, as described earlier, to form the waveguide layer. Doped silica layers may patterned by the same methods described for pure silica layers. After the doped core is produced, the cladding layer is deposited by the same general techniques used to form the core waveguide layer. With reference to FIG. 9, an undoped silica sol is spun-coated over the structure of FIG. 8 to form cladding layer 71. The cladding layer 71 is consolidated to form cladding 72 and the finished buried waveguide structure is shown in FIG. 10. Either or both the doped core 68, and the cladding 72, may be made using multiple layers as described in connection with FIG. 4. As just mentioned, alternatively the cladding layer may be down-doped.

Figure 11:
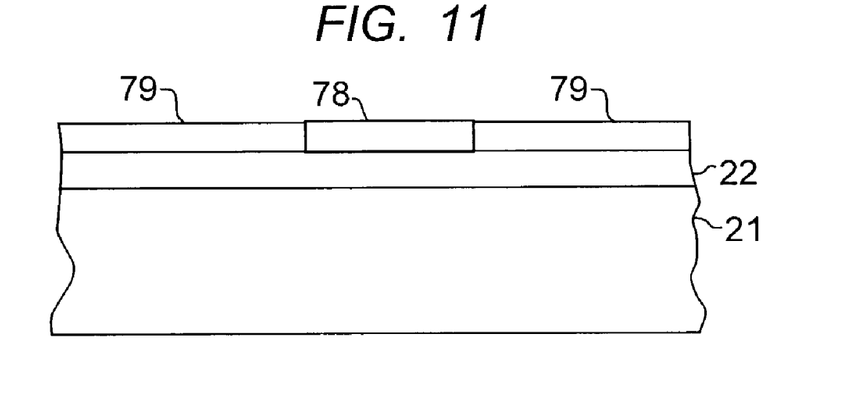
FIGS. 11, 12, and 13 illustrate steps for forming a partially buried waveguide.
Figure 12:
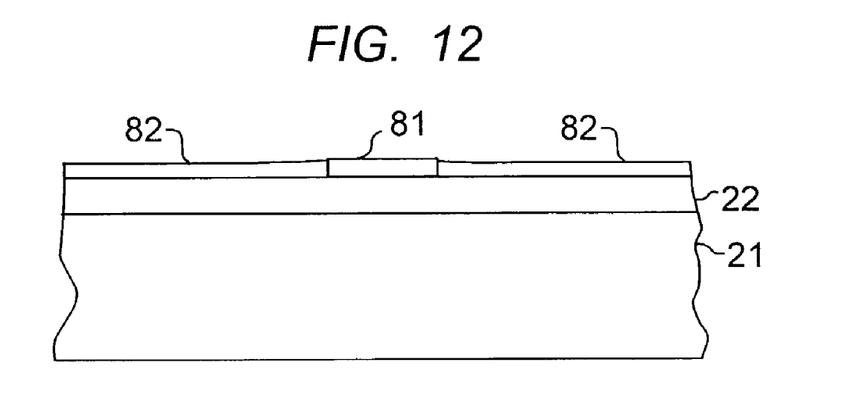

The waveguide 68 in the embodiment just described is buried on all surfaces including the top. Planar waveguides with just the sides and bottom of the waveguide are also useful. This allows easier access to the waveguide for input/output signals, or for taps. This form of waveguide may be prepared using the approach shown in FIGS. 11 and 12. A doped core precursor layer 78 is formed by spin-coating the substrate with a doped sol, drying the sol, and patterning the dried sol. Then the undoped sol for the cladding is spin-coated on the substrate to form a layer 79 with a thickness approximately equal to the thickness of the core precursor layer 78. That structure, shown in FIG. 11, is then heated to simultaneously consolidate both the core 81 and the cladding 82 as shown in FIG. 12.

A similar result may be reached if the doped core is completed, i.e. consolidated, prior to forming the cladding layer. This approach is preferred if the cladding layer is formed by the multiple layer method. If the multiple layer method is applied to the approach represented by FIG. 11, it is difficult to maintain the core and cladding separate.

Figure 13:
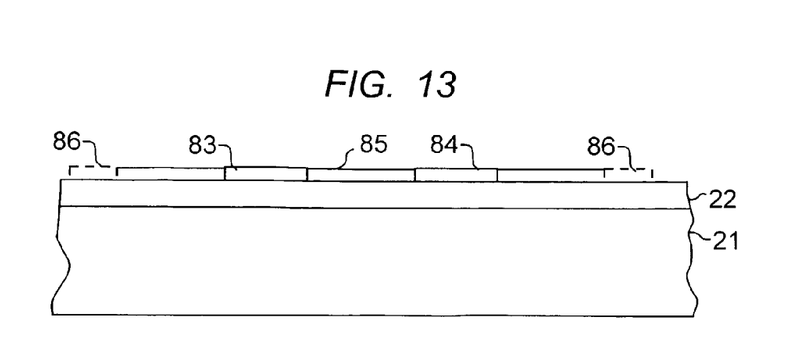

In a typical optical integrated circuit, there will be many waveguides on the substrate. In the procedure just described wherein the core is completed prior to forming the cladding, the cores of adjacent waveguides will serve as molds for the cladding layer sol. This is represented in FIG. 13, where adjacent waveguides 83 and 84 form wiers for the fluid sol 85 therebetween. If the sol has appropriate viscosity, the existing cores will limit the height of the cladding layer, even when the multiple layer method is used. To provide uniform thickness on the outside edges, dummy cores 86

(shown in phantom) may be used. This approach widens the allowable techniques for applying the sol layer. Since the thickness of the cladding layer is self-limiting, methods other than spin-coating may be used.

The following examples are presented to demonstrate the invention.

EXAMPLE 1

Deionized water in an amount of 1.72 kg and 0.281 kg of TMAH solution (25 wt % supplied by SACHEM) were placed in a high shear mode mixer. Mixing was started at a speed of 70 rpm. 3.75 kg of silica powder (Degussa Aerosil OX50) was added gradually, over a period of an hour, while mixing continued. After completion of the powder addition, the mixer speed was set to 1200 rpm for 2 hours. Additional deionized water (0.797 kg) and TMAH solution (0.122 kg) were added to the dispersion without slowing the mixing speed. Mixing continued for 1 hour. The resultant sol had a viscosity of about 20 cP and a pH of 11.5. The sol was centrifuged at a speed of 4,000 rpm for 5 minutes to remove large particle agglomerates (approx diameter>10 µm). Further dilution with a 1.5 wt % solution of TMAH in water (made by further dilution of the 25 wt % stock solution) formed the desired colloidal sol (55 wt % $SiO_2$, 1.5 wt % TMAH, 43.5 wt % water) with a low shear viscosity of 15 cP.

In this example, a 4 inch silicon wafer was used as the substrate. The substrate was pre-coated by dispensing approximately 4 ml of TMAS (tetramethylammonium silicate, 17.1 wt %) to wet the substrate. The wafer was spun at 1500 rpm for 30 seconds to uniformly coat the wafer, leaving a thin TMAS layer (approx 100 nm).

In the same manner, the silica sol was spun-coated on the coated silicon wafer and the wafer heated on a hot plate at 350° C. to form a dried porous silica layer. The dried film was heated to 650° C. for 1 hour in pure oxygen to remove organic components and residual water. The substrate was then heated in nitrogen to 1300° C. for two hours to consolidate (sinter) the film. The resultant film was approximately 1.1 µm thick.

EXAMPLE 2

The sol produced in example 1 was used in the multi-layer method represented by FIG. 4. After dispensing the sol on the TMAS-coated wafer, the wafer was heated on a hot plate as in example 1, then flushed with nitrogen to cool. Another layer of TMAS was applied to the dried sol coating and the steps above repeated for three layers. The muti-layer film was fired at 1300° C. to produce a coating approximately 3 µm thick.

EXAMPLE 3

In this example, 1.03 mol/L of TMA phosphate ($TMA_3PO_4$) was used to produce a doped silica film. The TMA phosphate was made by vigorous mixing of 40 ml of TMAH (25 wt %) with 3.5 ml of phosphoric acid ($H_3PO_4$, 85.7 wt %) and deionized water. The pH of the mixture was 12.25, close to the $pKa_3$ of ortho-phosphoric acid resulting in deprotonated phosphate ions. Then, 20 ml of the TMA phosphate was added to 35 g of silica sol (produced by the procedure in Example 1) and mixed thoroughly. The TMAH content is about 7 wt % in the total sol, and the solid loading is 34 wt %. The phosphorus-doped film was formed by spin-coating at 2000 rpm for 30 seconds, and the coating was dried and fired as in Example 1. The resulting coating had a thickness of approximately 0.5 µm, a $P_2O_5$ content of about 7 mol %, and an index of refraction of 1.469.

The patterned films described above were formed using a subtractive process, i.e. the film was deposited as a blanket layer, then masked, and exposed regions removed by etching. A simpler approach is an additive method where the film precursor material is deposited directly in the desired pattern. This is achieved according to one embodiment of the invention by selectively depositing a layer of hydrophobic material in a negative of the pattern desired. Since the silica sol that is coated on the substrate is aqueous, it does not adhere to the hydrophobic material. Surface tension will cause the sol to form a relatively thick layer, selectively on regions of the substrate that are uncoated with the hydrophobic material. To illustrate, polydimethylsiloxane (PDMS) will form a coating on a silicon wafer that is not wet by the silica sol. The PDMS layer may be produced conveniently in a pattern using a stamp technique.

Figure 15:
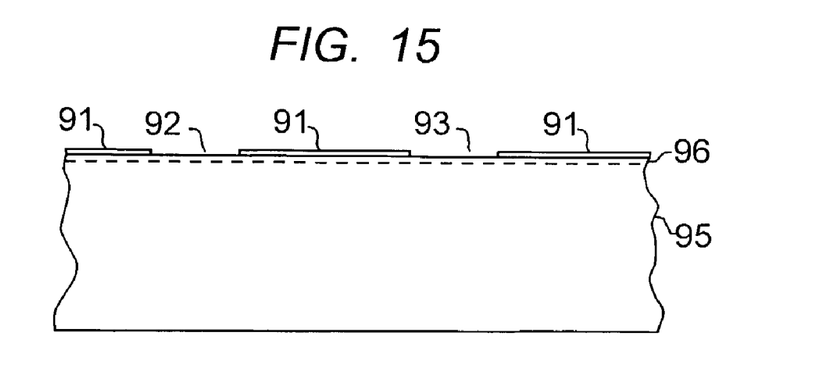
FIGS. 15, 16 and 17 represent steps in an alternative embodiment of the invention.

With reference to FIG. 15, substrate 95 is coated with a stamped pattern 91 of PDMS. The pattern has features 92 and 93 where there is no PDMS. The substrate may have a bonding layer 96 as described earlier. If a bonding layer is applied before the PDMS stamp, the PDMS stamp pattern blankets the bonding layer and extinguishes the wetting characteristics of those portions of the substrate covered with PDMS. Therefore, when the sol is applied it sees surfaces where wetting is enhanced, and surfaces where wetting is suppressed. The bonding layer is preferred, but optional. The effect of the non-wetting characteristics of PDMS may be sufficient in itself to produce the desired result.

Figure 16:
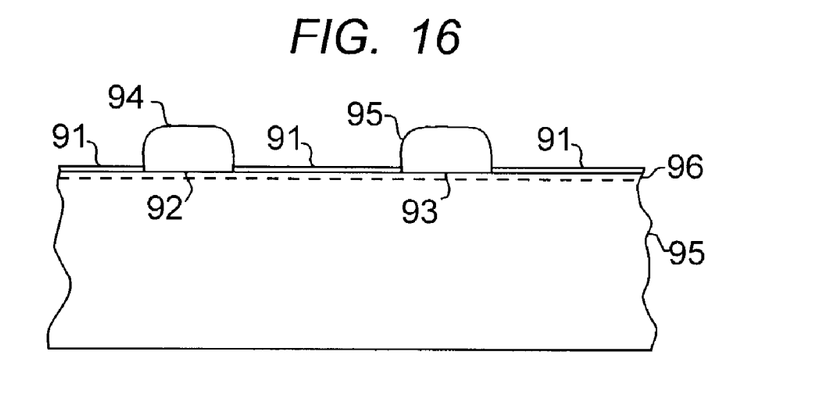
Figure 17:
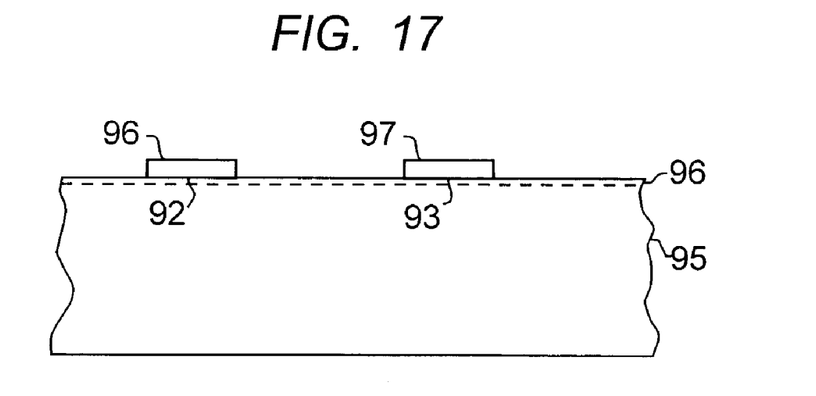

The sol is shown after application in FIG. 16, where selectively formed sol features 94 and 95 are evident.

It will also occur to those skilled in the art that similar results may be obtained by selectively applying the wetting layer. TMAS or other wetting material may be prepared with a suitable viscosity, and applied using a stamp technique. Other options to stamping the patterns will occur to those skilled in the art.

Reference herein to high silica waveguides is intended to refer to a body in which the predominant ingredient, more than 50% by weight, is silica, and the waveguide is highly transparent. High silica waveguides may include significant amounts of glass forming oxides or other additives.

It will be recognized by those skilled in the art that the substrate 21, 22 of FIG. 1 is part of the finished optical device. Typically, in a sol-gel process, the sol is poured into a mold, and the product of the process is a free standing body, for example, an optical fiber preform. The formation of thick film layers of optical quality, directly on a substrate of an optical device, e.g., a waveguide, is an object of the invention.

The term spin-coating as used herein has a well established meaning in the art. It is intended to mean coating a substrate while the substrate is rotated, typically at a speed greater than 10 rotations per second.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. Process for the manufacture of a high silica optical device comprising:
   (a) preparing a sol by forming a colloidal dispersion of silica particles and water by adding silica particles to water to form the colloidal dispersion,
   (b) coating the sol on a substrate, the substrate being a portion of the optical device,
   (c) drying the sol to form a dried sol layer and
   (d) patterning the dried sol layer by:
      (i) applying a masking layer to the dried sol layer leaving some portions of the dried sol gel layer covered by the masking layer and some portions exposed,
      (ii) removing the exposed portions of the dried sol layer, thereby producing a dried sol pattern.

2. The process of claim 1 including the additional step (e) of firing the dried sol pattern to consolidate it into vitreous glass.

3. The process of claim 1 wherein the substrate is coated by spin-coating.

4. Process for the manufacture of a high silica waveguide comprising:
   (a) coating a substrate with a bonding layer comprising a wetting layer,
   (b) preparing a sol by forming a colloidal dispersion of silica particles and water by adding silica particles to water to form the colloidal dispersion,
   (c) applying the sol to the substrate,
   (d) drying the sol to form a dried sol layer,
   (e) patterning the dried sol layer to form a pattern of dried sol,
   (f) firing the pattern to consolidate the pattern of dried sol to a pattern of vitreous glass.

5. The process of claim 4 wherein steps (a), (c), and (d) are repeated.

6. The process of claim 4 wherein the sol additionally contains a dopant.

7. The process of claim 6 wherein the dopant is selected from the group consisting of germanium, boron, and phosphorus.

8. The process of claim 6 including the additional steps, after step (f), of:
   (g) coating a sol on the pattern of vitreous glass,
   (h) drying the sol to a dried sol, and
   (i) consolidating the dried sol to vitreous glass wherein the sol applied to the substrate has a composition different from the sol coated on the pattern of vitreous glass.

9. The process of claim 4 wherein the bonding layer comprises TMAS.

10. The process of claim 4 wherein the bonding layer has a surface with lower surface energy than the surface of the substrate.

11. The process of claim 4 wherein step (c) is performed by spin coating.

12. Process for the manufacture of a buried waveguide comprising:
   (a) preparing a sol mixture comprising silica particles, water, and a dopant,
   (b) coating a substrate with a first bonding layer,
   (c) coating the first bonding layer with the sol mixture,
   (d) drying the sol mixture to form a first dried sol layer,
   (e) coating the first dried sol layer with a second bonding layer,
   (f) coating the sol mixture on the second bonding layer,
   (g) drying the sol mixture to form a second dried sol layer, the first and second dried sol layers comprising a multi-layer of dried sol,
   (h) consolidating the multi-layer to form a vitreous doped glass waveguide core layer,
   (i) patterning the vitreous glass waveguide core layer to form a vitreous glass core,
   (j) preparing a cladding sol by forming a mixture comprising silica particles, and water,
   (k) coating the cladding sol over the vitreous glass core,
   (l) drying the cladding sol to form dried cladding sol,
   (m) coating additional cladding sol on the dried cladding sol,
   (n) drying the additional cladding sol,
   (o) consolidating the dried cladding sol to vitreous cladding glass.

13. The process of claim 12 wherein steps (h) and (i) are replaced with:
   (h') patterning the multilayer to form a pattern,
   (i') consolidating the pattern to form a vitreous doped glass waveguide core layer.

14. The process of claim 12 wherein the cladding sol additionally contains a boron salt.

15. The process of claim 12 wherein the dopant in step (a) is a germanium salt.

16. The process of claim 12 wherein coating steps are performed by spin coating.

17. Process for the manufacture of a buried waveguide comprising:
   (a) forming a vitreous glass core waveguide on a substrate,
   (b) preparing a sol by forming a colloidal dispersion of silica particles and water by adding silica particles to water to form the colloidal dispersion,
   (c) coating the cladding sol over the vitreous glass core waveguide,
   (d) drying the cladding sol to form dried cladding sol,
   (e) coating additional cladding sol on the dried cladding sol,
   (f) drying the additional cladding sol,
   (g) consolidating the dried cladding sol to vitreous cladding glass wherein the vitreous glass core waveguide has a dopant or dopant level different from that of the vitreous cladding glass.

* * * * *